Nov. 18, 1952

G. T. DAIN 2,618,699

TELEGRAPH SYSTEM

Filed Oct. 29, 1947

3 Sheets-Sheet 1

INVENTOR
GORDON T. DAIN
BY Young, Emery & Thompson
ATTYS.

INVENTOR
GORDON T. DAIN
By Young, Emery & Thompson
Attys.

Nov. 18, 1952 G. T. DAIN 2,618,699

TELEGRAPH SYSTEM

Filed Oct. 29, 1947 3 Sheets-Sheet 3

INVENTOR
GORDON T. DAIN
By Young, Emery & Thompson
Atty's.

Patented Nov. 18, 1952

2,618,699

UNITED STATES PATENT OFFICE 2,618,699

TELEGRAPH SYSTEM

Gordon Taylor Dain, Buckinghamshire, England, assignor to British Telecommunications Research Limited, Taplow, Buckinghamshire, England, a British company Application October 29, 1947, Serial No. 782,881
In Great Britain January 10, 1947

9 Claims. (Cl. 178—2)

Figure 1:
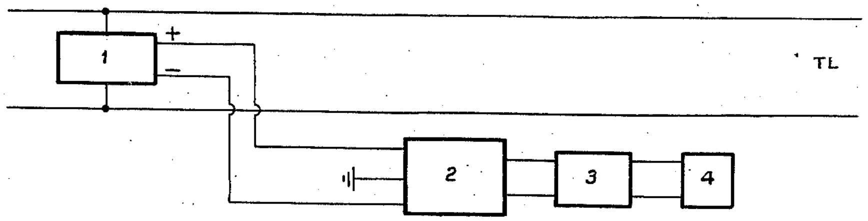

The present invention concerns improvements in or relating to telegraph systems.

In telegraph systems more especially those employing telegraph stations of the teleprinter or teletypewriter type, signals are transmitted from the sending to the receiving station each of which corresponds to a letter of the message being transmitted or to a particular operation of the carriage of the teleprinter or teletypewriter, e. g. figure shift, letter shift, space, carriage return, line space. These signals which correspond to message characters are received for example by an electromagnetic relay and bring about printing operations or operations of the carriage. The actual interpretation of the signals is at present a mechanical operation.

The system of telegraphy usually employed is based upon the international five unit code in which each message character signal consists of a positive start pulse followed by five equal pulses which may be positive or negative in varying combination depending on the character being transmitted and a negative stop pulse the pulses being positive and negative with respect to earth. At the same time it will be appreciated that the principles of the invention are applicable to other systems of telegraphy whether with equal or unequal letter codes e. g. seven unit code. It will be understood that while positive and negative pulses are referred to, the actual component of a signal may correspond to makes and breaks in a direct current or tone circuit or to different frequencies of current or to any distinctive kinds of pulses.

According to a feature of the present invention a circuit arrangement is provided for responding to a particular combination of message character signals in order to carry out a switch operation.

By this means by the transmission of a code signal such as the transmission of a signal corresponding to one or other of the normal message characters repeated a particular number of times for example, a desired switching operation may be obtained in addition to and quite distinct from the actual printing of the character corresponding to the signal or the operation of the carriage if the message character signal corresponds to a carriage operation.

According to a second feature of the invention an arrangement is provided comprising a signal pulse responsive device to be connected to the telegraph line, a time constant circuit controlled from the pulse responsive device and an automatic switch adapted to be operated from the time constant circuit only when a message character signal in the international five unit code having the number of pulses of one sign among the five unit pulses equal to or less than a fixed number and repeated a particular number of times in succession, is received by the pulse transforming device. Instead of controlling the automatic switch from the one time constant circuit only, it may be preferred to have a second time constant circuit also controlled from the pulse transforming device, and to carry out the switching operation in dependence on the response received from the two time constant circuits, one responding to the number of pulses of one sign and the other to the number of pulses of the other sign thus extending the number of characters which may be used for switch operations.

According to a third feature of the invention there is provided in combination a polarised relay adapted to respond in one way to pulses of one sign and to respond in a different way to pulses of opposite sign, means for charging or discharging a condenser in accordance with the response of the polarised relay whereby the potential reached across the condenser depends on the succession of pulses received, a gaseous discharge tube adapted to be fired when the condenser is charged to a certain potential and a relay connected so as to be energised when the gaseous discharge tube fires in order to initiate or prevent further switch operations. It may be arranged that the succession of pulses required to prevent the gaseous discharge tube from firing corresponds to the pulses in one signal corresponding to a character to be printed or to an operation of the carriage, e. g. the "Letter Shift" character. Alternatively it may be arranged that following on a character which prevents the tube from firing "Letter Shift" it requires the transmission of two further characters to raise the voltage across the condenser sufficiently to cause the tube to fire. It may be preferred to provide a second combination of a condenser, gaseous discharge tube and relay operating in the same manner as described and controlled by the operation of the first relay and a switching relay connected to be operated when the second relay is energised so as to release the said relay and discharge the condenser and also to initiate an automatic switch operation. Thus it may be arranged that the charging of the second condenser is interrupted so as to prevent the firing of the second tube whenever a character other than say "Letter Shift" is transmitted but that if "Letter Shift" is transmitted say five times or more successively then the charge on the condenser is allowed to build up and the second tube fires.

It may also be arranged that the switching relay is held up when operated to initiate an automatic switch operation but that the transmission of "Letter Shift" character a particular number of times causes the second discharge tube to fire again whereby the switching relay is de-energised and a further automatic switch operation is carried out.

Furthermore two condensers, gaseous discharge tube and relay circuits may be controlled from the polarised relay or relays, one according to the pulses of one sign and the other according to the pulses of the other sign, and together control a third condenser gaseous discharge tube and relay circuit which has a switching relay arranged as previously described.

The invention will be better understood by referring to Figs. 1 to 6 of the drawings accompanying this specification.

Fig. 1 illustrates in diagrammatic form the general principle for carrying the invention into effect. 1 represents a pulse responsive device connected in shunt of the telegraph line TL; 2 represents a time constant circuit including a trigger device such as a cold cathode gas-discharge tube or a thyratron type of hot-cathode gas-discharge tube and a condenser, the charge or discharging of which through appropriate resistances determines the instant at which the trigger will strike; 3 represents a second time constant circuit of similar elements and 4 represents a third time constant circuit or switching control circuit. The operation or non-operation of a relay in each time constant circuit depends upon the particular pulses received, the arrangement being such that the last and final time constant circuit will only be effective when pulses corresponding to the signal determined upon for effecting the switching operation is received. Obviously the number of time constant circuits may vary in accordance with the signal selected for this purpose.

Figure 2:
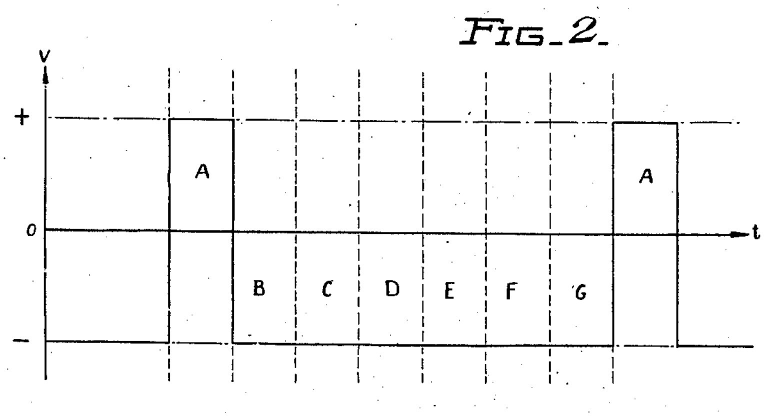

Fig. 2 illustrates the form of the signal for a "Letter Shift" character which consists of a positive start signal A, a negative signal throughout the five unit intervals B, C, D, E, F of the character signal and a negative stop signal G.

Figures 3, 5, 6:
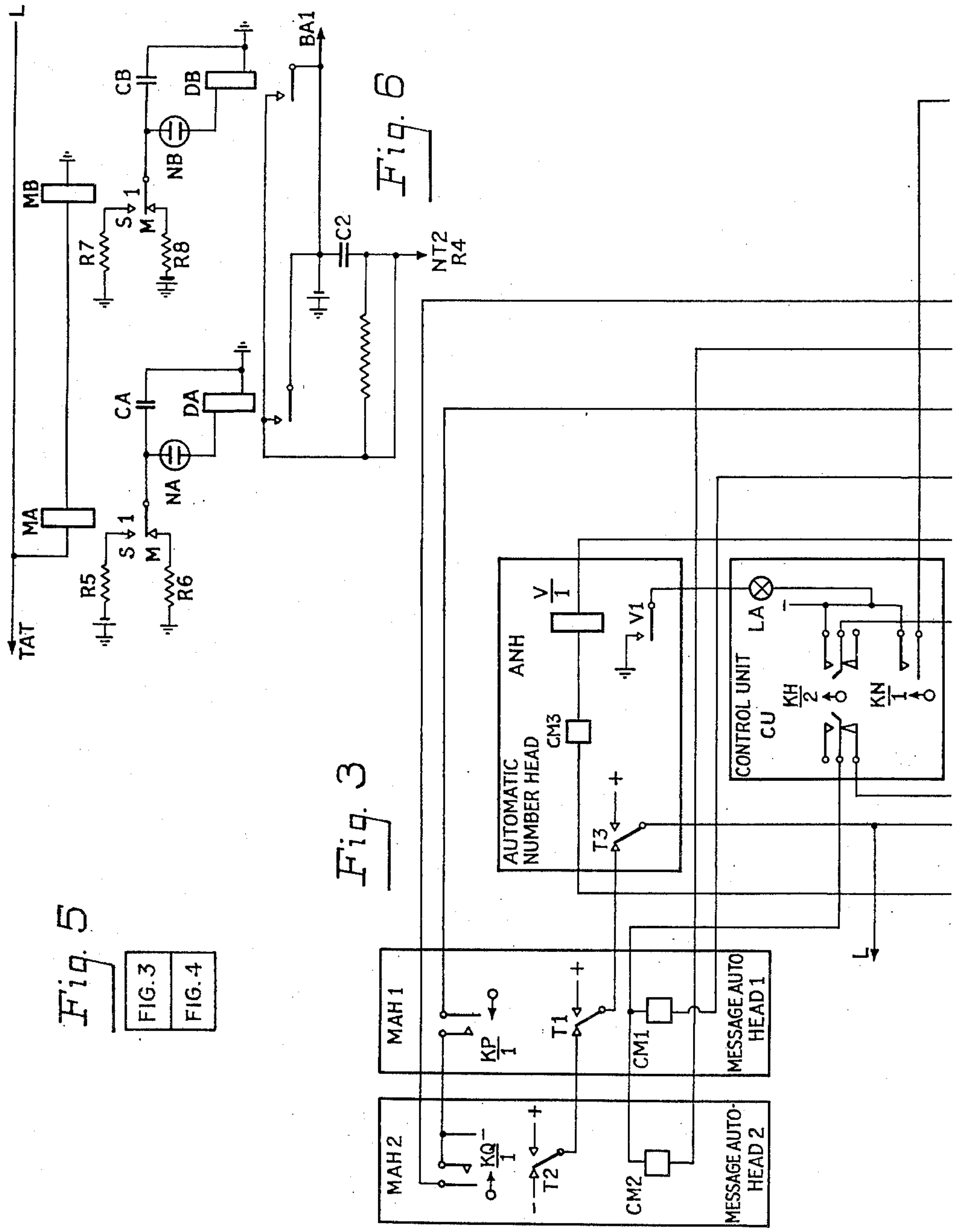
Figure 4:
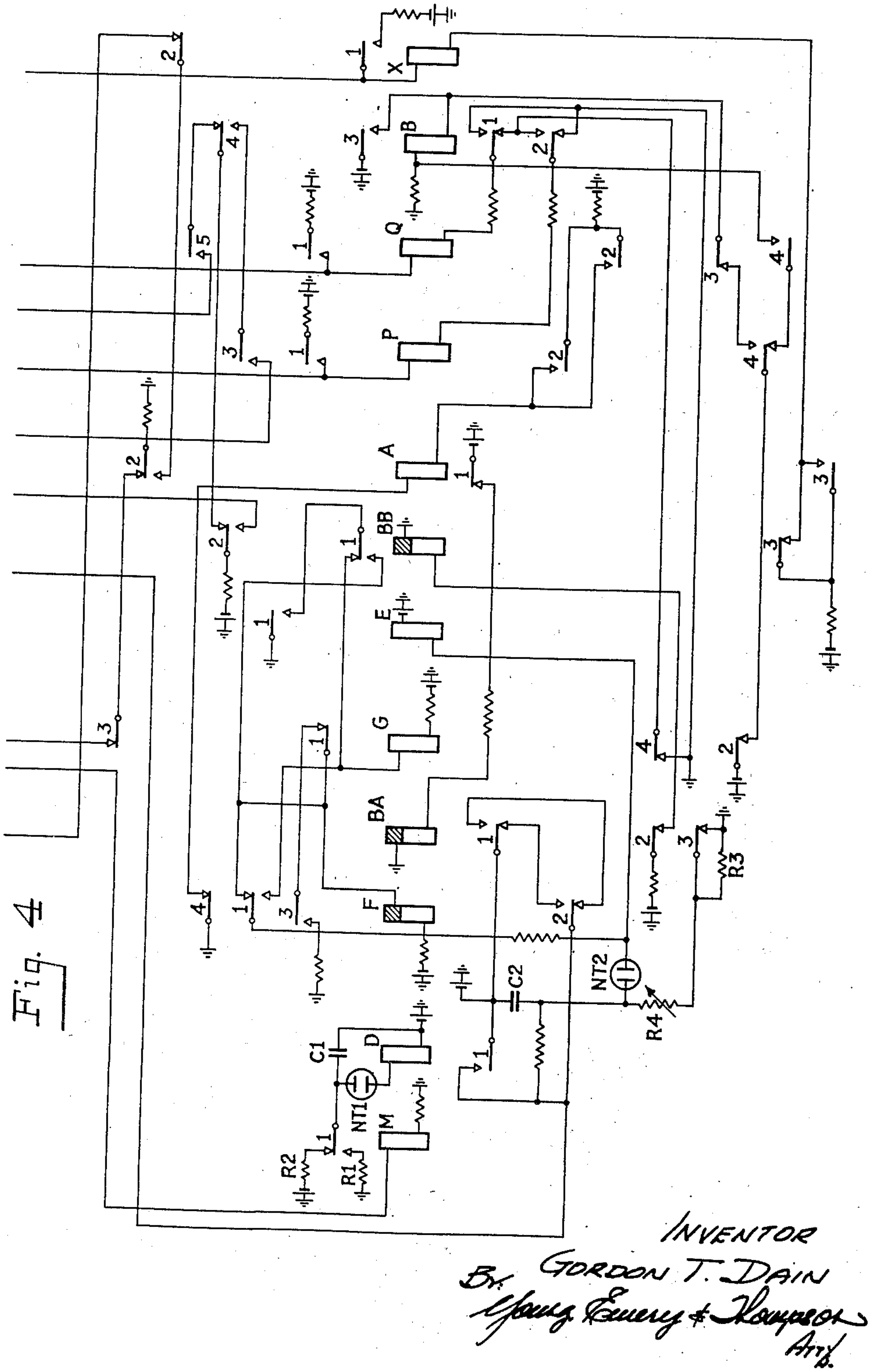

Figs. 3 and 4 when put together in the manner shown in Fig. 5, show an embodiment of the invention in the form of a relay unit and also show the necessary control arrangements to be associated with a teleprinter or teletypewriter transmitting station.

Fig. 6 illustrates a possible modification to be incorporated in the relay unit shown in Figs. 3 and 4.

It is known to provide at a teleprinter or teletypewriter transmitting station a transmitting arrangement for inserting a serial number prior to the transmission of a message. The number transmitting arrangement is usually separate from the message transmitting arrangement and may comprise for instance a device in which pins are fixed in one or more rotatable drums, the pins controlling contacts which effect the operation of a transmitting relay. The pins are fixed to the drum in such a manner that as the drum or drums is or are stepped for each message transmitted, the number transmitted is increased by one.

The number transmitted will be the serial number of the mesage relative to a particular telegraph line or channel and there may be cases where in order to use the line or channel with the utmost economy, more than one message transmitter is adapted to be associated with a line or channel. The invention has particular application to controlling the connection and disconnection of the automatic number transmitting arrangement to the message transmitting arrangements and this application is shown in Figs. 3 and 4.

Referring to these figures, MAH1 and MAH2 show diagrammatically two message transmitting devices or message auto-heads arranged to be associated with a single number transmitting device or auto-number head ANH. The message auto-heads and the auto-number head may be of known construction and only a sufficient amount of the equipment is shown to enable the invention to be understood. Thus in the message auto-heads only the clutch magnets CM1 and CM2, the mark and space contact tongues T1 and T2 and the start keys KP and KQ are shown, while in the auto-number head only the clutch magnet CM3, the mark and space contact tongue T3 and the control relay V together with its contact V1 are shown.

The equipment also includes a control unit provided with two keys KH and KN and a lamp LA which glows while the auto-number head is in operation. The key KH, the hold key, is provided for interrupting the transmission of a message while the key KN, the number cut-off key, is provided for preventing the operation of the auto-number head if it is not required to send a serial number preceding a message.

Finally the equipment includes a relay unit RU which comprises the whole of Fig. 4. The purpose of this unit is to respond to the message character signals transmitted by the message auto-heads and the auto-number head and to operate when a "letter shift" character is transmitted a predetermined number of times. The operation of the relay unit causes a switching operation to be effective whereby the clutch magnet of the auto-number head is de-energised and the clutch magnet of one of the message auto-heads is energised. Discrimination between the message character signals transmitted is effected in the relay unit by means of a timing circuit which responds only when the "letter shift" character, which on the five-unit code consists of a positive start signal pulse followed by five negative signal pulses and a negative stop signal pulse, is repeated a predetermined number of times.

The operation of the equipment takes place in the following manner. When a perforated message transmitting tape is inserted in one of the message auto-heads, say MAH1 and the start key KP is depressed, the relay unit operates to cause the energisation of the clutch magnet CM3 of the auto-number head ANH and the serial number of the mesage is transmitted over the line L. No further operation of the relay unit occurs until the end of the number transmission when the auto-number head transmits five "letter shift" characters. The timing device in the relay unit now responds and causes the de-energisation of the clutch magnet CM3 of the auto-number head ANH and the energisation of the message auto-head MAH1 whereupon the message is transmitted. At the end of the message the message auto-head MAH1 transmits ten "letter shift" characters and a different timing device or the same timing device having its characteristics altered responds and disconnects the clutch magnet CM1. The reason for using five "letter shift" characters in the first case and ten in the second will be given subsequently in the description.

Considering now the sequence of operations in greater detail, it will be assumed initially that neither message auto-head is transmitting.

When a perforated message transmitting tape is inserted in message auto-head MAH1 and the start key KP is depressed, relay P of the relay unit is operated from positive battery B2, relay P and negative battery. Contact P1 locks relay P. Contact P2 closes the circuit for energising relay A via contact P4. Contact P3 prepares the circuit for the message auto-head control magnet (CM1). Contact P4 closes a circuit for energising relay B extending via negative battery, contacts G2, P4, Q3, relay B, positive battery. Relay A in energising at contacts A1 releases relay BA which is normally energised. As relay A is designed to operate quicker than relay B, contact A2 prevents the completion of the message head control magnet CM1 and prepares a circuit for operating the auto-number head control magnet CM3. On the operation of relay B contacts B1 and B2 change over the locking circuit for relay P. Contact B3 completes a locking circuit for relay B. Contact B4 closes a further point in the circuit for control magnet CM1 which is now opened at contact A2. When relay BA restores, contact BA1 by restoring allows condenser C2 to charge provided that contact D1 is open. Contact BA2 when restored causes the operation of relay BB. Contact BA3 when restored cuts out resistance R3 in the charging circuit for condenser C2, thereby providing a circuit with a shorter time constant for a purpose to be described later. Contact BB1 when operated prepares a locking circuit for relay E and prepares an operating circuit for relay F. Contacts BB2 when operated completes the circuit for control magnet CM3 of the auto-number head ANH and for relay V. The operation of the control magnet causes the transmitting mechanism of the auto-number head to be clutched to a constantly rotating shaft in known manner whereby the serial number of the message is transmitted while the operation of relay V at contacts V1 closes a circuit for the lamp LA.

During transmission of a number by auto-number head ANH signals are sent out to line L via contact T3. The impulse responsive device relay M connected to the line operates to positive and negative potentials and in the case described the moving contact of relay M is in the "Space" position for positive potentials and in the position as shown for "Mark" for negative potentials. Contact M1 therefore controls a charging and discharging circuit for condenser C1, the charging circuit extending via resistance R1, the discharging circuit via resistance R2. The values of C1, R1 and R2 are so arranged that the potential of C1 cannot build up to exceed the strike voltage of the cold cathode tube NT1 when a Letter Shift character (see Fig. 2) is transmitted the five unit code for which contains one positive start impulse, but the cold cathode tube NT1 will always fire when any other character is transmitted which will have at least one positive impulse among the succession of impulses constituting the five unit code the effect of which added to the residual effect of the start signals will cause the voltage across the condenser to reach a higher value than the start signal by itself can bring about. If cold cathode tube NT1 fires, relay D is operated and D1 in turn controls a second time constant circuit comprising, condenser C2, resistance R4 (R3 being short circuited by BA3, the function of which will be described later) and cold cathode tube NT2 and relay E, thereby preventing the condenser C2 being charged to a sufficient potential to cause firing of the cold cathode tube NT2.

The time constant of this circuit is considerably greater than the time constant of the circuit R1, C1 that is to say the resistance R4 is such that the condenser C2 will not reach a firing voltage until after its circuit has been completed for a time equal to the period required for the transmission of a plurality of characters.

The operation of D1 which takes place during every signal except that of the Letter Shift is adapted substantially to short circuit C2 so that it is substantially discharged. Consequently only when a signal corresponding to a Letter Shift character is transmitted a number of times, say five, will the cold cathode tube NT2 fire and relay E operate. When relay E operates, it locks operated from positive battery over contacts E1 operated, BB1 operated, F1 unoperated. Contact E1 also closes a direct circuit for switching relay F which is a slow to release relay. When relay F operates contact F1 releases relay E. Contact F2 completes a further circuit for discharging condenser C2. Contact F3 completes a locking circuit for relay F. Contact F4 interrupts the energising circuit for relay A. Relay A restores to cause relay BA to re-energise over contact A1. Relay BA by operating causes relay BB to restore and the restoration of contacts A2 and BB2 opens the circuit for control magnets CM3 and completes the circuit for energising the message head control magnet CM1 through P3 operated. The de-energisation of magnet CM3 causes transmission by the auto-number head to cease while the operation of magnet CM1 causes the operation of the message auto-head MAH1. The restoration of contact BA1 disconnects the supplementary discharging circuit for condenser C2.

The message fitted to the message auto-head MA1 is transmited to line over contact T1 and relay M operates in synchronism with the mark and space elements in the characters transmitted and at contact M1 controls the operation of relay D. On the receipt of ten or more Letter Shift characters during which time relay D is not operated, condenser C2 is charged via R3 and R4 to a sufficient potential to cause cold cathode tube NT2 to fire and energise relay E. When relay E operates contact E1 completes a locking circuit for relay E via contacts F1 and BB1 and also completes an energising circuit for operation of relay G. When relay G operates contact G1 disconnects the F relay which restores slowly and on finally releasing opens the circuit for relay E at contact F1. Relay E in turn releases and opens the circuit of relay G which releases. Contact G2 prevents any change in the state of energisation of relay B during the delay time of relay F. During this delay time, relay P is released by the opening of G4. Contact G3 disconnects the circuit for the control magnet CM1 and stops further transmission by the message auto-head MAH1. Contact F4 in restoring completes a circuit by which relay A can be energised in order to re-establish the message numbering circuit if the second start key (KQ) has been pressed to operate relay Q. Contact F2 when restored completes a discharge circuit for condenser C2 via BA1.

If key KQ has been pressed during the transmission from message auto-head MAH1 relay Q will operate and lock up via Q1, B1 and positive. When relay P is disconnected via contacts G4, B2 a circuit is prepared to effect release of relay B by short circuiting via negative battery, contacts G2, P4, Q4, resistance, positive battery.

Relay B therefore restores when G2 releases, and cannot be re-operated via Q3. At contacts B4 in its restored position the operation circuit is prepared for control magnet CM2 of message auto-head MAH2. Contact B1 maintains the circuit for relay Q. Relay Q at contact Q2 completes circuit for relay A. Relay A at A1 opens circuit of relay BA and relay BA at contact BA2 closes the circuit of relay BB. Relay BB on operating at BB2 completes circuit for magnet CM3 of auto-number head ANH. The operation now proceeds in substantially the same way as in the case of a message controlled by contact KP of message auto-head MAH1 that is to say after the number is sent the relays E and F operate and thereby bring about the transfer from control magnet CM3 to CM2 at contacts BB2 and B4 due to the lack of energisation of relay B and the release of relay BB as previously described. Message auto-head MAH2 then transmits its message to line L over contact T2.

It will thus be seen that the effect of one repetition of the Letter Shift signal a predetermined number of times, e. g. five times, is to effect the transfer of the control of the marking relay M from the auto-number head to the message auto-head with which it is working in conjunction, while a further repetition of the Letter Shift signal a predetermined number of times, say ten times, effects the transfer of the control of the marking relay M from the message auto-head last in use to the auto-number head which is now working in conjunction with the other message auto-head.

The reason for using the five-fold repetition of the Letter Shift signal in the first instance and the ten-fold repetition in the second will appear from the following:

A serial number is prefixed to a message by the originating station, but if the message in the course of transmission is received and retransmitted by an intermediate station, the latter station will add its own message serial number so that the message will then be sent with two serial numbers preceding the text. In the absence of differentiation between five-fold and ten-fold repetitions the first five Letter Shift signals after the first serial number would effect the switching from the auto-number head to the message auto-head and the second five Letter Shift signals after the second serial number would effect the switching back from the message auto-head to the auto-number head. The transmission would therefore be switched after the second serial number and the message would not be sent. In order to overcome this difficulty the arrangement described is provided.

A series of five Letter Shifts will cause the transmission to be switched from the auto-number head to the message auto-head but once the message auto-head has started transmitting the transmission will not be stopped by a sequence of only five Letter Shift characters but only when ten Letter Shift characters are transmitted.

It is therefore possible to retransmit a message starting with any quantity of a serial number each followed by the five Letter Shift characters.

The distinction between five Letter Shift characters and ten Letter Shift characters is detected by the time constant circuit consisting of the condenser C2 in association with the resistance R3 and R4. When resistance R3 is short circuited the time constant is less and the transmission of five Letter Shift characters suffices to fire the cold cathode tube NT2. When however, contact BA3 is open and resistance R3 thus introduced into the time constant circuit, the time constant is increased and the transmission of ten Letter Shift characters is necessary before the potential difference across condenser C2 is raised to the value necessary to fire cold cathode tube NT2.

If during the transmission of message from message auto-head MAH2, key KP is depressed and operates relay P this has no affect on relay B as contact Q3 disconnects the operating circuit for this relay until the release of relay Q at the end of message transmitted from auto-head MAH2.

If it is not desired to send a number with a message the operation of number-cut-off key KN completes an energising circuit for relay X via, negative battery, KN2, BB3 and resistance to positive battery which operates and locks up over its own contact X1. At contact X2 the circuit for the control magnet CM3 of the auto-number head ANH is disconnected. Relay M remains at its mark position and fails to operate relay D. Cold cathode tube NT2 therefore fires causing the circuit to change back to the next auto-message head control magnet to be used.

If it is desired to interrupt a message transmission and prevent the changeover from the message auto-head to another, "hold" key KH is operated and the circuits of the control magnets are disconnected at KH1 and a discharge circuit is completed at KH2 to prevent the charging of condenser C2 and therefore to prevent cold cathode tube NT2 from firing and the changeover of auto-message heads from taking place.

Instead of as above arranging that cold cathode tube NT1 will strike whenever a character other than Letter Shift is transmitted it may be arranged that following on a Letter Shift character it requires the transmission of two other characters to raise the voltage across condenser C1 sufficient to cause cold cathode tube NT1 to fire. This allows greater latitude in the value of the firing voltage of NT1 and does not cause false operation because the charging circuit for condenser C2 is arranged to have a time constant long enough to require more than two characters to pass without operating cold cathode tube NT1 before cold cathode tube NT2 fires and operates relay E.

Referring now in more detail to the character discriminating circuit shown in Fig. 4 typical values of the components may be as follows:

R1—7,500 ohm fixed resistance.
R2—10,000 ohm fixed resistance plus 0 to 25,000 ohm variable.
C1—8 μF fixed condenser.
NT1—Cold cathode discharge tube of nominal strike voltage 85 volts.
D—high speed relay having two 1000 ohm coils, the coils being series aiding.

Condenser C1 charges during transmission of "space" character elements via R1 and discharges during transmission of "mark" character elements via R2.

Considering a series of "Letter Shift" character elements being transmitted, it can be shown that the peak voltage attained by the condenser C1 after the transmission of '$n$' such characters are given by the equation:

$$V_{max}=\frac{Ey(x-1)\left\{1-\frac{1}{(x^n y^n)}\right\}}{(xy-1)}$$

where $V_{max}$—Maximum voltage on C1 after '$n$' Letter Shifts.

$E$=applied voltage to circuit (i. e. 160 volts on +—80 volts supply).

$x$=exponential, $(20/C_1R_1)$ $y$=exponential, $(130/C_1R_2)$

C1 and R being measured in micro-farads and kilo-ohms respectively.

As '$n$' becomes fairly large, the equation reduces to:

$$V_{max}=\frac{Ey(x-1)}{(xy-1)}$$

and with $R1=7{,}500$ ohm, $R_2=35{,}000$ ohm and E=160 volts.

$$V_{max}=82.4 \text{ volts}$$

Hence with these constants the voltage across the tube NT1 with continuously repeated Letter Shift characters will never be sufficient to cause it to fire and operate relay D.

The "Letter Shift" character has a minimum amount of "space" elements in its make up, and the character which provides the least build up on the condenser apart from "Letter Shift" is the character Q. In a similar manner it can be shown that, using the same nomenclatures as above, the equation giving the maximum voltage achieved on the continuous transmission of '$n$' Q characters is:

$$V_{max}=\frac{Eb(x-1)\left[(ax+1)\left\{1-\frac{1}{(abx^2)^n}\right\}\right]}{(abx^2)-1}$$

where $a$=exponential $(60/CR_2)$ and $b$=exponential $(50/CR_2)$.

As '$n$' becomes greater than 4, the term $$\frac{1}{(abx^2)^n}$$

becomes negligible and the equation reduces to:

$$V_{max}=\frac{Eb(x-1)(ax+1)}{abx^2-1}$$

Using the same CR constants as for "Letter Shifts" above and the same applied voltage of 160 volts the maximum voltage built up on repeated transmission of the Q character is 109.6 volts.

Thus the difference between the voltage built up by transmitting Qs and that obtained by transmitting the Letter Shift character becomes 27.2 volts, and as long as the cold cathode tube flashes between 82.4 and 109.6 volts the requirements are satisfied, i. e. relay D is operated from the firing of cold cathode tube NT1 on all characters except Letter Shift.

By using a variable resistance in $R_2$, it is possible to adjust the circuit to respond from varying values of applied electro-motive force or cold cathode tube firing voltage.

By a modification of the system above described it is possible to effect a discrimination by the transmission of certain other characters in the international five unit code.

Two discriminating circuits are used in place of the discriminating circuit including condenser C1 in Fig. 4 and these are shown in Fig. 6. TAT indicates the connection from the transmitting contacts T3, T1, T2 to the marking relays MA and MB (in series), and L the connection to line. The marking relays MA and MB will replace the relay M in the main figure.

Contact MA1 of relay MA in its inoperative position completes a charging circuit for condenser CA via battery resistance R5, contact MA1 condenser CA earth. In its operated position it completes a discharging circuit via resistance R6. Cold cathode tube NA is connected across condenser CA in series with relay DA the contact DA1 of which is shown.

Contact MB1 of relay MB in its inoperative position completes a discharging circuit for condenser CB via resistance R7. In its operated position it completes a charging circuit for condenser CB via battery resistance R8, contact MB1, condenser CB, earth. Cold cathode tube NB is connected across condenser CB in series with a relay DB of which the contact DB1 is shown.

The values of CA and R6 can be set so that when the MA1 tongue is on the "Space" contact, the condenser CA is virtually short circuited by the low resistance R6, while the combination of condenser CA and resistance R5 enables cold cathode tube NA to fire after a period equal to two pulse elements (40 milliseconds) of marking signal.

The cold cathode tube NA will thus fire when any of the following message characters are transmitted:

B, C, G, K, M, O, Q, U, V, X, Figure Shift, Letter Shift all of which have more than two successive marking pulses in the five unit code signal.

It can be arranged that the condenser CB is virtually short circuited by R7 which is a low value when contact MB1 is inoperative while when contact MB1 is operated the combination of condenser CB and resistance R8 enables the cold cathode tube NB to fire after a period greater than one pulse element (20 milliseconds), but less than two pulse elements of "Space" signal. Thus cold cathode tube NB will fire for all message characters with the exception of:

F, J, K, Q, X, Y, Figure Shift, Letter Shift which alone do not have successive spacing pulses in the five pulse code signal.

Of these characters K, Q, X, Figure Shift and Letter Shift fire cold cathode tube NA thus the characters F, J and Y are the only ones which do not cause either cold cathode tube NA or NB to fire.

Hence a train of any one or combination of any one of these characters can be used to initiate a simple switching operation.

Referring back to the main circuit description, if contact D1 (Fig. 4) is replaced by contacts DA1 and DB1 wired in parallel, condenser C2 will be discharged during the transmission of every character with the exception of F, J and Y and a succession of these will initiate the required switching operation.

It will be seen from the foregoing that if different circuit constants are used in combination of several differentiating circuits, it is possible to select various character combinations to initiate similar switching operations.

Furthermore the number of repetitions may be varied provided they are sufficient clearly to distinguish from characters which may be repeated in the message.

I claim:

1. In a circuit arrangement for responding to a particular combination of positive and negative pulses, a discriminating circuit, means for applying positive and negative pulses to said discriminating circuit, a first switching device operated under the control of said discriminating circuit when the pattern of positive and negative pulses applied thereto is other than said particular combination, a condenser, means for charging said condenser, means for discharging said condenser upon the operation of said first switching device and a second switching device connected to operate when the voltage across said condenser reaches a predetermined value.

2. In a telegraph system a line, means at the transmitting end of said line for transmitting message character signals over said line, said message character signals comprising pulses of opposite polarity, at least one discriminating circuit, means for applying said pulses to said discriminating circuit, means in said discriminating circuit which operate in response to a message character signal having a first predetermined number of pulses of one polarity, a condenser, a charging circuit for said condenser closed on the initiation of signal transmission, a discharging circuit for said condenser closed in response to the operation of said operating means and a switching device connected to be operated when the voltage across said condenser reaches a predetermined value, the time constant of the charging circuit for said condenser being at least as great as the duration of transmission of a second predetermined number of message character signals whereby said switching device operates when a message character signal in which said first predetermined number of pulses of one polarity is absent is repeated said second predetermined number of times.

3. A telegraph system as claimed in claim 2 wherein one discriminating circuit only is employed comprising a second condenser, a charging circuit for said condenser closed in response to pulses of one polarity, a discharging circuit for said condenser closed in response to pulses of the opposite polarity, a discharge tube connected in circuit with said condenser to fire on the transmission of a message character signal having a predetermined number of pulses of said one polarity and a switching device connected in circuit with said discharge tube and energised when said discharge tube fires to complete the discharging path for said first condenser.

4. A telegraph system as claimed in claim 2 wherein two discriminating circuits are employed the first discriminating circuit comprising a second condenser, a charging circuit for said second condenser closed in response to pulses of one polarity, a discharging circuit for said second condenser closed in response to pulses of opposite polarity, a first discharge tube connected in circuit with said second condenser to fire on the transmission of a message character signal having a first predetermined number of pulses of said one polarity, a first switching device connected in circuit with said first discharge tube and energised when said discharge tube fires to complete the discharging path for said first condenser, the second discriminating circuit comprising a third condenser, a charging circuit for said third condenser closed in response to pulses of said opposite polarity, a discharging circuit for said third condenser closed in response to pulses of said one polarity, a second discharge tube connected in circuit with said third condenser to fire on the transmission of a message character signal having a second predetermined number of pulses of said opposite polarity and a second switching device connected in circuit with said second discharge tube and energised when said discharge tube fires to complete the discharging path for said first condenser.

5. A telegraph system as claimed in claim 2 wherein means are provided responsive to the operation of said switching device for altering the time constant of said charging circuit so that it is at least as great as the duration of transmission of a third predetermined number of message character signals.

6. A telegraph system as claimed in claim 4 comprising a first polarised relay for responding to pulses of one polarity, a second polarised relay for responding to pulses of the opposite polarity, means for closing the charging circuit for said second condenser in response to the operation of said first polarised relay and means for closing the charging circuit for said third condenser in response to the operation of said second polarised relay.

7. A telegraph system as claimed in claim 4 wherein said message character signals comprise marking and spacing signals in the international five unit code and said second switching device operates in response to a message character signal having two consecutive spacing pulses while said third switching device operates in response to a message character signal having three consecutive marking pulses, the time constant of the charging circuit for said first condenser being at least as great as the duration of transmission of a predetermined number of message character signals whereby said first switching device operates in response to the repeated transmission a predetermined number of times of any of the letters F, J and Y and to the repeated transmission a predetermined number of times of any combination of the letters F, J and Y.

8. In a telegraph system a line, means at the transmitting end of said line for transmitting message character signals over said line, said message character signals comprising pulses of opposite polarity, a first condenser, means responsive to the transmission of pulses of one polarity for charging said first condenser and responsive to the transmission of pulses of the opposite polarity for discharging said first condenser, a first gaseous discharge tube connected in circuit with said first condenser to conduct when said first condenser is charged by a first predetermined number of pulses of said one polarity, a first relay connected in circuit with said first discharge tube and energised when said first discharge tube conducts, a second condenser, a charging circuit for said second condenser closed on the initiation of signal transmission, a discharging circuit for said second condenser closed in response to the energisation of said relay, a second gaseous discharge tube connected in circuit with said second condenser to conduct when the voltage across said second condenser reaches a predetermined value and a second relay connected in circuit with said second discharge tube and energised when said second discharge tube conducts, the time constant of the charging circuit for said second condenser being at least as great as the duration of transmission of a second predetermined number of message character signals whereby said second relay operates when a message character signal in which said first predetermined number of pulses of one polarity is absent is repeated said second predetermined number of times.

9. In a telegraph system a line, means at the transmitting end of said line for transmitting message character signals over said line, said message character signals comprising marking and spacing pulses in the international five-unit code, a discriminating circuit, means for applying said pulses to said discriminating circuit, means in said discriminating circuit which operate in response to a message character signal having a single spacing pulse in addition to the start pulse, a condenser, a charging circuit for said condenser closed on the initiation of signal transmission, a discharging circuit for said condenser closed in response to the operation of said operating means and a switching device connected to be operated when the voltage across said condenser reaches a predetermined value, the time constant of the charging circuit for said condenser being at least as great as the duration of transmission of a predetermined number of message character signals whereby said switching device operates when a letters shift signal is repeated said predetermined number of times.

GORDON TAYLOR DAIN.

REFERENCES CITED

The following references are of record in the file of this patent:

UNITED STATES PATENTS

| Number | Name | Date |
|---|---|---|
| 1,943,475 | Gurley | Jan. 16, 1934 |
| 2,094,733 | Byrnes | Oct. 5, 1937 |
| 2,110,015 | Fitzgerald | Mar. 1, 1938 |
| 2,193,810 | Wheeler et al. | Mar. 19, 1940 |
| 2,300,045 | Gammell | Oct. 27, 1942 |
| 2,334,574 | Neiswinter | Nov. 16, 1943 |
| 2,384,558 | Potts | Sept. 11, 1945 |
| 2,419,581 | Marshall et al. | Apr. 29, 1947 |
| 2,424,571 | Lang | July 29, 1947 |
| 2,441,145 | Hansen | May 11, 1948 |
| 2,470,677 | Anderson | May 17, 1949 |
| 2,481,112 | Hanley | Sept. 6, 1949 |
| 2,485,551 | Angel | Oct. 25, 1949 |
| 2,487,186 | Schuler | Nov. 8, 1949 |
| 2,501,592 | Bacon | Mar. 21, 1950 |